(12) United States Patent
Ferone

(10) Patent No.: US 12,403,906 B2
(45) Date of Patent: Sep. 2, 2025

(54) SYSTEMS AND METHODS FOR VIRTUALLY HITCHING AND ALIGNING A FOLLOWING VEHICLE TO A LEAD VEHICLE

(71) Applicant: Toyota Motor Engineering & Manufacturing North America, Inc., Plano, TX (US)

(72) Inventor: Christopher Ferone, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 276 days.

(21) Appl. No.: 17/976,236

(22) Filed: Oct. 28, 2022

(65) Prior Publication Data

US 2024/0140425 A1 May 2, 2024

(51) Int. Cl.
*B60W 30/165* (2020.01)
*B60W 30/09* (2012.01)

(52) U.S. Cl.
CPC .......... *B60W 30/165* (2013.01); *B60W 30/09* (2013.01); *B60W 2530/201* (2020.02); *B60W 2554/4041* (2020.02); *B60W 2554/4044* (2020.02); *B60W 2556/65* (2020.02)

(58) Field of Classification Search
CPC ............... B60W 30/165; B60W 30/09; B60W 2530/201; B60W 2556/65
See application file for complete search history.

(56) References Cited

U.S. PATENT DOCUMENTS

| | | | |
|---|---|---|---|
| 5,295,551 A | 3/1994 | Sukonick | |
| 8,352,112 B2* | 1/2013 | Mudalige | G08G 1/22 342/458 |
| 10,657,825 B2 | 5/2020 | Oshida et al. | |
| 10,906,583 B2* | 2/2021 | Li | B62D 15/0285 |
| 11,864,073 B2* | 1/2024 | Brinkman | H04W 4/46 |
| 2010/0044998 A1 | 2/2010 | Franchineau | |
| 2015/0342110 A1* | 12/2015 | Peake | A01B 69/004 701/50 |
| 2017/0168503 A1* | 6/2017 | Amla | B60W 30/00 |
| 2019/0233034 A1* | 8/2019 | Viele | B60D 1/36 |
| 2019/0318306 A1 | 10/2019 | Mere | |
| 2019/0385461 A1 | 12/2019 | Blomstrand et al. | |
| 2020/0001919 A1* | 1/2020 | Niewiadomski | B60D 1/62 |

(Continued)

FOREIGN PATENT DOCUMENTS

DE 102022126696 A1 * 10/2023 ............... B60D 1/62

*Primary Examiner* — Rachid Bendidi
*Assistant Examiner* — Nada Mahyoob Alqaderi
(74) *Attorney, Agent, or Firm* — Christopher G. Darrow; Darrow Mustafa PC

(57) ABSTRACT

Systems, methods, and other embodiments described herein relate to improving initiating hitchless towing between a lead vehicle and a following vehicle. In one embodiment, a method includes in response to initiating hitchless towing between a lead vehicle and a following vehicle, generating a hitching path that provides a route from the following vehicle to the lead vehicle, controlling the following vehicle to travel the hitching path, aligning the following vehicle with the lead vehicle, and controlling the following vehicle to perform the hitchless towing by following the lead vehicle without a physical connection.

20 Claims, 6 Drawing Sheets

(56) References Cited

U.S. PATENT DOCUMENTS

| | | | |
|---|---|---|---|
| 2020/0057453 A1* | 2/2020 | Laws | G05D 1/0088 |
| 2020/0211401 A1 | 7/2020 | Oshida et al. | |
| 2020/0286387 A1* | 9/2020 | Zhou | G08G 1/0175 |
| 2022/0135158 A1 | 5/2022 | Lee | |
| 2022/0308577 A1* | 9/2022 | Pasch | H04W 4/46 |
| 2023/0328490 A1* | 10/2023 | Brinkman | B60T 8/323 |
| | | | 340/902 |

* cited by examiner

SYSTEMS AND METHODS FOR VIRTUALLY HITCHING AND ALIGNING A FOLLOWING VEHICLE TO A LEAD VEHICLE

TECHNICAL FIELD

The subject matter described herein relates, in general, to improving hitchless towing, and, more particularly, to virtually hitching and aligning a following vehicle with a lead vehicle.

BACKGROUND

Vehicles may tow other vehicles using physical connections, such as a hitch and ball configuration, but the task of physically connecting vehicles presents challenges. For example, aligning a hitch and ball requires maneuvering vehicles in a precise, complicated manner. Current methods to simplify the hitching process include implementing hitching aids to assist a driver in aligning a towing vehicle's hitch with a towed vehicle's hitch ball. For example, hitching aids include streaming footage from a towing vehicle's backup camera on a display within the towing vehicle, suggesting maneuvers for a driver to make to connect a towing vehicle's hitch with a towed vehicle's hitch ball, and autonomously moving a vehicle's hitch to connect with a towed vehicle's hitch ball. While hitching aids reduce the burden a driver would normally have in reversing and aligning the towing vehicle with the towed vehicle, hitching aids require the towing vehicle to move to the towed vehicle. Additionally, hitching the towing vehicle to the towed vehicle does not ensure that the towing vehicle and towed vehicles are aligned. As a result, when the towing vehicle begins moving, jack knifing may occur as a result of misalignment.

SUMMARY

In one embodiment, example systems and methods relate to a manner of improving hitchless towing. As previously discussed, current methods to connect vehicles to one another present difficulties. For example, current methods include using hitching aids to assist drivers in hitching a towing vehicle to a towed vehicle. However, using hitching aids require a driver to move a towing vehicle to a towed vehicle and may result in alignment issues.

Therefore, in one embodiment, a system that improves hitchless towing by controlling a following vehicle to hitch and align with a lead vehicle is disclosed. In one aspect, a system initiates hitchless towing through a handshake process. For example, the handshake process includes, in one approach, receiving a request to initiate hitchless towing from the lead vehicle, accepting the request at the following vehicle, and upon acceptance of the request, establishing a wireless communication link between the lead vehicle and the following vehicle.

In one embodiment, responsive to initiating hitchless towing between a lead vehicle and a following vehicle, the system generates a hitching path that defines a route from the following vehicle to the lead vehicle. In one embodiment, generating the hitching path includes determining physical constraints associated with the following vehicle. The physical constraints include, for example, dimensions of the following vehicle and a turning radius of the following vehicle. The system, in one or more arrangements, generates a kinematically feasible hitching path, where the kinematically feasible path is a path that the following vehicle is capable of executing given its physical constraints.

After generating the hitching path, in one embodiment, the system controls the following vehicle to travel the hitching path. In one approach, the system controls the following vehicle to autonomously travel on the hitching by controlling the following vehicle to execute the generated maneuvers associated with the hitching path (e.g., by controlling the steering, speed, direction of travel, etc. of the following vehicle).

After controlling the following vehicle to reach the end of the hitching path, in one embodiment, the system aligns the following vehicle with the lead vehicle. Alignment with the lead vehicle is, in one approach, a position of the following vehicle associated with the following vehicle being located behind the lead vehicle in a substantially similar orientation as the lead vehicle. In one configuration, the system determines whether the lead vehicle is stationary or moving as the following vehicle travels on the hitching path. The system, in one approach, determines that the lead vehicle is stationary and aligns the following vehicle with the lead vehicle by controlling the following vehicle to move behind an initial position of the lead vehicle in a substantially similar orientation as the lead vehicle.

Similarly, the system may determine that the lead vehicle is moving as the following vehicle travels the hitching path. Responsive to determining the lead vehicle is moving, the system, in one embodiment, controls the following vehicle to travel to an end of the hitching path. To successfully align with the lead vehicle, the system receives a path history from the lead vehicle via the established wireless communication link. The path history is, in one embodiment, the route the lead vehicle has taken since the system generated the hitching path. In this way, the system, in one embodiment, controls the following vehicle to align with the new position of the lead vehicle by controlling the following vehicle to follow the path history after the following vehicle reaches the end of the hitching path. In one approach, the system aligns the following vehicle with the moving lead vehicle by controlling the following vehicle to move behind the lead vehicle (i.e., by reaching the end of the hitching path and subsequently following the path history of the lead vehicle) in a substantially similar orientation as the lead vehicle.

After aligning the following vehicle with the lead vehicle, the system, in one embodiment, controls the following vehicle to perform the hitchless towing by following the lead vehicle without a physical connection. In one approach, the system determines a trajectory of the lead vehicle and controls the following vehicle to follow the trajectory of the lead vehicle. In this way, the system improves the process of initiating hitchless towing between a lead vehicle and following vehicle.

In one embodiment, a hitching system is disclosed. The system includes one or more processors and a memory communicably coupled to the one or more processors. The memory storing instructions that, when executed by the one or more processors, cause the one or more processors to responsive to initiating hitchless towing between a lead vehicle and a following vehicle, generate a hitching path that provides a route from the following vehicle to the lead vehicle, control the following vehicle to travel the hitching path, align the following vehicle with the lead vehicle, and control the following vehicle to perform the hitchless towing by following the lead vehicle without a physical connection.

In one embodiment, a non-transitory computer-readable medium and including instructions that when executed by one or more processors cause the one or more processors to perform one or more functions is disclosed. The instructions include instructions to responsive to initiating hitchless towing between a lead vehicle and a following vehicle, generate a hitching path that provides a route from the following vehicle to the lead vehicle, control the following vehicle to travel the hitching path, align the following vehicle with the lead vehicle, and control the following vehicle to perform the hitchless towing by following the lead vehicle without a physical connection.

In one embodiment, a method is disclosed. In one embodiment, the method includes in response to initiating hitchless towing between a lead vehicle and a following vehicle, generating a hitching path that provides a route from the following vehicle to the lead vehicle, controlling the following vehicle to travel the hitching path, aligning the following vehicle with the lead vehicle, and controlling the following vehicle to perform the hitchless towing by following the lead vehicle without a physical connection

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
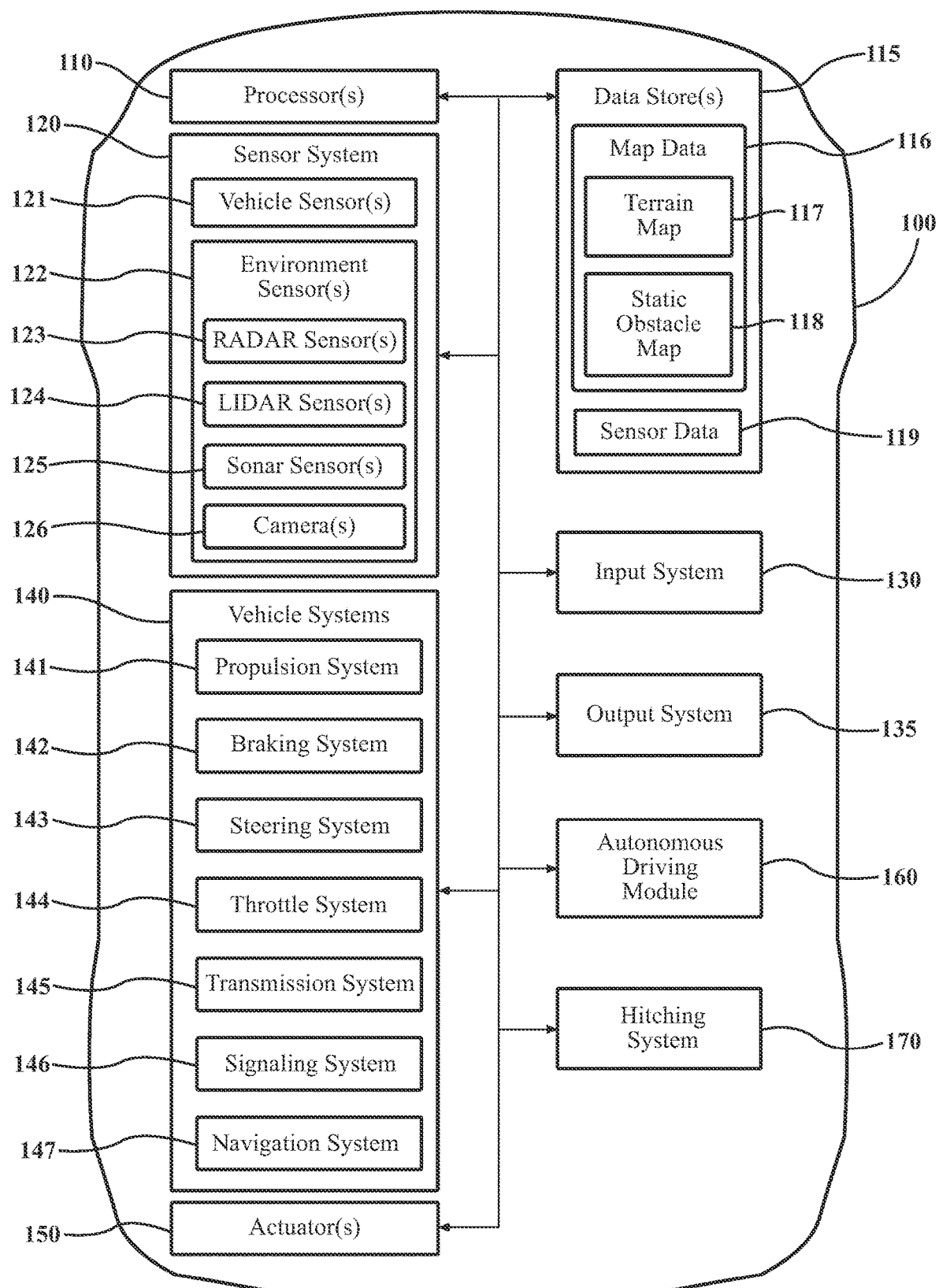
FIG. 1 illustrates one embodiment of a vehicle within which systems and methods disclosed herein may be implemented.

Systems, methods, and other embodiments associated with improving hitchless towing are disclosed herein. As previously noted, assisting drivers in hitching vehicles to one another may involve the driver executing inconvenient maneuvers and may result in misalignment between vehicles. Therefore, in one embodiment, a system that improves hitchless towing by controlling a following vehicle to align and hitch with a lead vehicle is disclosed.

Hitchless towing is, in one embodiment, a method of controlling a following vehicle to follow a lead vehicle without a physical connection between the following and lead vehicles. For example, hitchless towing may include communicating instructions from the lead vehicle over a wireless connection for the following vehicle to execute. In one aspect, a system initiates hitchless towing through a handshake process. The handshake process includes, in one approach, receiving a request to initiate hitchless towing from the lead vehicle, accepting the request, and upon acceptance of the request, establishing a wireless communication link between the lead vehicle and the following vehicle. As an example, the handshake process, in one arrangement, includes receiving a request from the lead vehicle or the following vehicle, where the request is generated from, for example, a human machine interface (HMI) (e.g., a display within the lead or following vehicle). The system may further acquire a confirmation of the request via an electronic signal generated via inputs on, for example, a user interface in the vehicle that receives the request (i.e., the following or lead vehicle). In one or more configurations, the system acquires the confirmation when a user accepts the request using a user interface (UI). In response to acquiring the confirmation of the request, the system, in one approach, initiates hitchless towing.

In one embodiment, responsive to initiating hitchless towing between a lead vehicle and a following vehicle, the system generates a hitching path that defines a route from the following vehicle to the lead vehicle. In one approach, the system determines a position and an orientation of the lead and following vehicles and generates the hitching path from the position of the following vehicle to the position of the lead vehicle. Moreover, in one embodiment, the system generates one or more maneuvers for adjusting the orientation of the following vehicle to be a substantially similar orientation as the lead vehicle at the end of the hitching path. Further, in one embodiment, generating the hitching path includes determining physical constraints associated with the following vehicle. The physical constraints include, for example, dimensions of the following vehicle, a turning radius of the following vehicle, and other aspects that influence how the following vehicle maneuvers. In one embodiment, the system determines the physical constraints of the following vehicle using a lookup table. As another example, the system may determine the physical constraints of the following vehicle by processing sensor data that identifies characteristics of the following vehicle. In any case, the system, in one or more arrangements, generates a kinematically feasible hitching path. The kinematically feasible path is a path that the following vehicle is capable of executing to comply with the physical constraints. Accordingly, the hitching path is, in one embodiment, a kinemtatically feasible path starting from the initial position of the following vehicle to the initial position of the lead vehicle, ending in the following vehicle being positioned behind the lead vehicle in a substantially similar orientation as the lead vehicle.

After generating the hitching path, in one embodiment, the system controls the following vehicle to travel the hitching path. In one approach, the system controls the following vehicle to travel the hitching path by executing the generated maneuvers associated with the hitching path (e.g., by controlling the steering, speed, direction of travel, etc. of the following vehicle). The system, in one or more arrangements, acquires sensor data from one or more sensors of the following vehicle about the hitching path. In one embodiment, the system processes the sensor data to identify one or more obstacles (e.g., other vehicles, buildings, plants, pedestrians, etc.) on the hitching path. For example, the system controls the following vehicle to avoid the one or more obstacles on the hitching path. The system may control the following vehicle to avoid an obstacle on the hitching path by performing an evasive maneuver (e.g., applying the brakes of the following vehicle, stopping the following vehicle, steering the following vehicle around the obstacles, etc.).

In one configuration, sensor data (e.g., video data) captured by the one or more sensors of the following vehicle is streamed on a display of the lead and/or following vehicle. Accordingly, a user may observe the path of the following vehicle and identify obstacles that may intersect with the following vehicle as the following vehicle travels on the hitching path. In one embodiment, a user may manually stop the following vehicle from moving further if the user identifies an obstacle in the path of the following vehicle using, for example, an HMI (e.g., by interacting with a virtual stop button on a display within the vehicle). In any case, the system controls the following vehicle to avoid obstacles on the hitching path automatically (e.g., using an ADAS system).

After controlling the following vehicle to reach the end of the hitching path, in one embodiment, the system aligns the following vehicle with the lead vehicle. In one approach, the system aligns the following vehicle with the lead vehicle by positioning the following vehicle behind the lead vehicle in a substantially similar orientation as the lead vehicle. In one configuration, the system determines whether the lead vehicle is stationary or moving as the following vehicle travels on the hitching path. The system may determine the state of the lead vehicle by processing sensor data acquired by one or more sensors of the following vehicle. For example, the system may process image and radar data indicative of a position and speed of the lead vehicle to determine whether the lead vehicle is moving. Alternatively, the system may determine the state of the lead vehicle via communications received from the lead vehicle. For example, the lead vehicle may communicate its current speed and position to the following vehicle as the following vehicle travels on the hitching path. In any case, the system, in one approach, determines that the lead vehicle is stationary and aligns the following vehicle with the lead vehicle by controlling the following vehicle to move behind an initial position of the lead vehicle in a substantially similar orientation as the lead vehicle. In a similar manner, the system may determine that the lead vehicle is moving as the following vehicle travels the hitching path instead of remaining stationary. Accordingly, the system, in one embodiment, controls the following vehicle to travel to an end of the hitching path.

To successfully align with the lead vehicle when nonstationary, the system acquires a path history from the lead vehicle via the established wireless communication link. The path history is, in one embodiment, the route the lead vehicle has taken since the system generated the hitching path. In this way, the system, in one embodiment, controls the following vehicle to align with the current position of the lead vehicle by controlling the following vehicle to follow the path history after the following vehicle reaches the end of the hitching path. In one approach, the system aligns the following vehicle with the moving lead vehicle by controlling the following vehicle to move behind the lead vehicle (i.e., by reaching the end of the hitching path and subsequently following the path history of the lead vehicle) in a substantially similar orientation as the lead vehicle.

After aligning the following vehicle with the lead vehicle, the system, in one embodiment, controls the following vehicle to perform the hitchless towing by following the lead vehicle without a physical connection. That is, the system controls the following vehicle to maintain a defined distance behind the lead vehicle and to execute instructions acquired from the lead vehicle. The defined distance is, for example, the shortest distance between the lead vehicle and the following vehicle that allows the following vehicle to follow the lead vehicle without a risk of colliding with the lead vehicle. The defined distance may be preset by a user. As another example, the system may automatically determine the defined distance based on the physical constraints and operating parameters of the vehicle.

In one approach, the system achieves the hitchless towing through correlating movements of the following vehicle with the lead vehicle. This process may involve determining a trajectory of the lead vehicle. The system can determine the trajectory of the lead vehicle in different ways, including, for example, by receiving the explicit trajectory from the lead vehicle. In another example, the system derives the trajectory independently by processing sensor data associated with the lead vehicle. For example, the system may determine the trajectory of the lead vehicle by identifying the speed, direction of travel, and environmental conditions (e.g., the lead vehicle using a turn signal, the lead vehicle approaching a stoplight, the lead vehicle driving in an exit lane, etc.) associated with the lead vehicle from the sensor data. In any case, the system controls the following vehicle to follow the lead vehicle without a physical connection to the lead vehicle. In this way, the system improves the process of hitchless towing between a lead vehicle and following vehicle.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In particular, the vehicle 100 is, in one or more arrangements, a following vehicle, where a "following vehicle," as used herein, is any form of motorized transport capable of virtually hitching to and following the path of a lead vehicle without the presence of a physical connection. For example, a following vehicle may include an autonomous vehicle, a trailer, a recreational vehicle, etc. In the instance of a trailer, the trailer may be equipped with front and rear wheels/axles or other elements to provide for maneuvering the trailer without a physical connection with the leading vehicle. In any case, the following vehicle is any vehicle capable of electronically hitching to and following a lead vehicle. The lead vehicle is, in one embodiment, any vehicle within physical proximity (e.g., within a 100-foot radius) of the vehicle 100 and capable of sending/receiving electronic message to/from the vehicle 100 to facilitate control of the vehicle 100. In some implementations, the vehicle 100 may be any robotic device or form of motorized transport that, for example, includes a system to control the vehicle 100 to follow a path, and thus benefits from the functionality discussed herein associated with virtually hitching and aligning the vehicle 100 to a lead vehicle.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a hitching system 170 that is implemented to perform methods and other functions as disclosed herein relating to improving hitchless towing by electronically hitching and aligning a following vehicle with a lead vehicle without the use of a physical connection.

Figure 2:
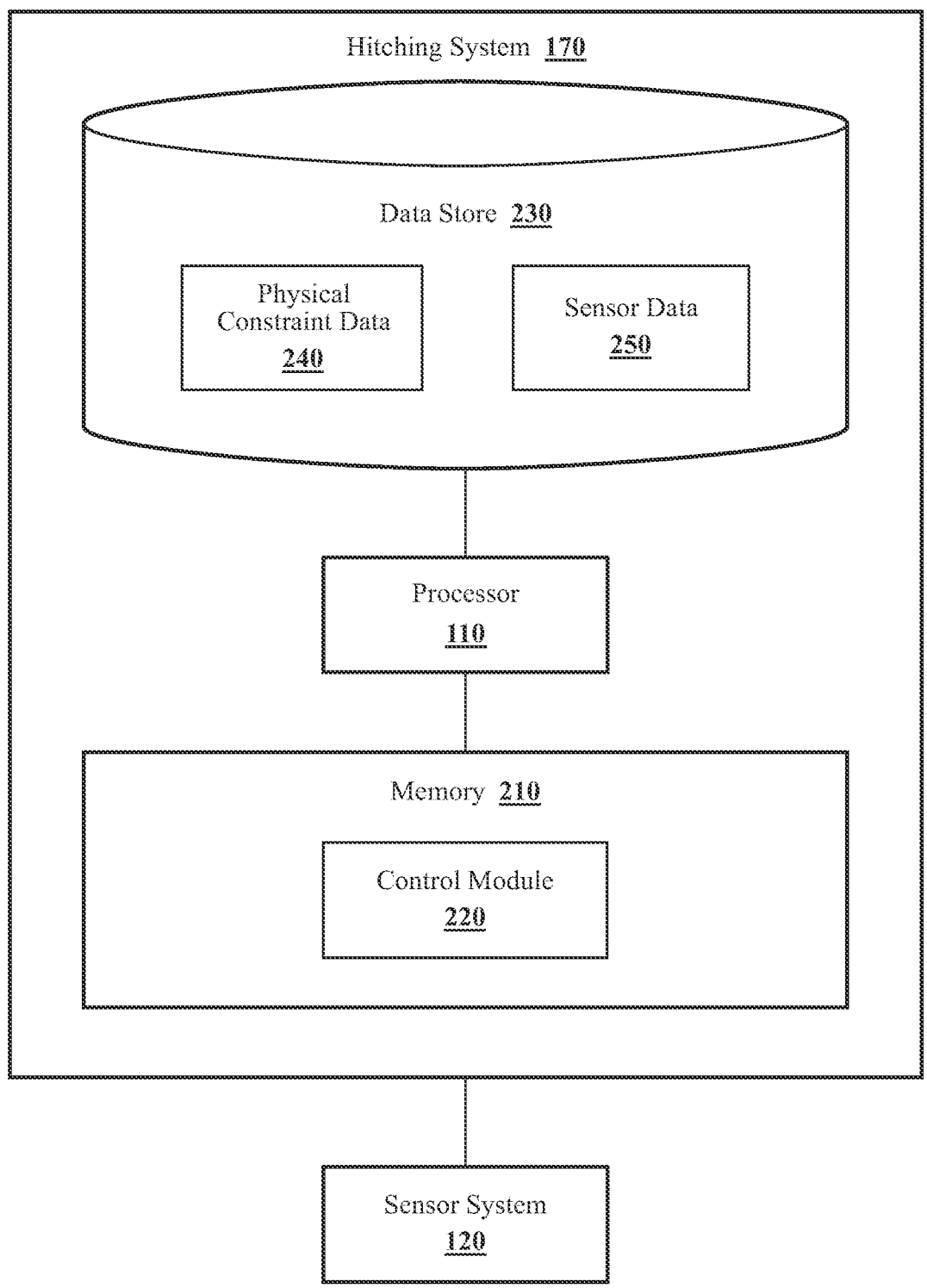
FIG. 2 illustrates one embodiment of a hitching system that is associated with improving the process of hitchless towing between a lead vehicle and following vehicle.

With reference to FIG. 2, one embodiment of the hitching system 170 of FIG. 1 is further illustrated. The hitching system 170 is shown as including a processor 110 from the vehicle 100 of FIG. 1. Accordingly, the processor 110 may be a part of the hitching system 170, the hitching system 170 may include a separate processor from the processor 110 of the vehicle 100, or the hitching system 170 may access the processor 110 through a data bus or another communication path. In one embodiment, the hitching system 170 includes a memory 210 that stores a control module 220. The memory 210 is a random-access memory (RAM), read-only memory (ROM), a hard-disk drive, a flash memory, or other suitable memory for storing the module 220. The module 220 is, for example, a computer-readable instructions that when executed by the processor 110 cause the processor 110 to perform the various functions disclosed herein.

With reference to FIG. 2, the control module 220 generally includes instructions that function to control the processor 110 to receive data inputs from one or more sensors of the vehicle 100. The inputs are, in one embodiment, observations of one or more objects in an environment proximate to the vehicle 100 and/or other aspects about the surroundings. As provided for herein, the control module 220, in one embodiment, acquires sensor data 250 that includes at least camera images. In further arrangements, the control module 220 acquires the sensor data 250 from further sensors such as a radar 123, a LiDAR 124, and other sensors as may be suitable for identifying vehicles and locations of the vehicles.

Accordingly, the control module 220, in one embodiment, controls the respective sensors to provide the data inputs in the form of the sensor data 250. Additionally, while the control module 220 is discussed as controlling the various sensors to provide the sensor data 250, in one or more embodiments, the control module 220 can employ other techniques to acquire the sensor data 250 that are either active or passive. For example, the control module 220 may passively sniff the sensor data 250 from a stream of electronic information provided by the various sensors to further components within the vehicle 100. Moreover, the control module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

In addition to objects in an environment proximate to the vehicle 100, the sensor data 250 may also include, for example, information about a location of the vehicle 100 and information about a lead vehicle that the vehicle 100 connects to. Moreover, the control module 220, in one embodiment, controls the sensors to acquire the sensor data 250 about an area that encompasses 360 degrees about the vehicle 100 in order to provide a comprehensive assessment of the surrounding environment. Of course, in alternative embodiments, the control module 220 may acquire the sensor data about a forward direction alone when, for example, the vehicle 100 is not equipped with further sensors to include additional regions about the vehicle and/or the additional regions are not scanned due to other reasons.

Moreover, in one embodiment, the hitching system 170 includes a data store 230. In one embodiment, the data store 230 is a database. The database is, in one embodiment, an electronic data structure stored in the memory 210 or another data store and that is configured with routines that can be executed by the processor 110 for analyzing stored data, providing stored data, organizing stored data, and so on. Thus, in one embodiment, the data store 230 stores data used by the control module 220 in executing various functions. In one embodiment, the data store 230 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on.

In one embodiment, the data store 230 further includes physical constraint data 240 about the vehicle 100. The physical constraint data 240 includes, for example, dimensions of the vehicle 100 and a turning radius of the vehicle 100. In one approach, the physical constraint data 240 is stored in the data store 230 as, for example, a lookup table. The lookup table includes, for example, the dimensions of the vehicle 100 and the turning radius of the vehicle 100. As such, in one embodiment, the control module 220 acquires the physical constraint data 240 of the vehicle 100 via the lookup table, which may be preconfigured by an original equipment manufacturer (OEM) when the vehicle is originally provisioned. Alternatively, the control module 220, in one arrangement, acquires the physical constraint data 240 by processing portions of the sensor data 250 about the vehicle 100. As an example, the control module 220 may acquire the physical constraint data by processing inertial measurement unit (IMU) data associated with the vehicle 100 as the vehicle 100 travels.

The control module 220, in one embodiment, is further configured to perform additional tasks beyond controlling the respective sensors to acquire and provide the sensor data 250. For example, the control module 220 includes instructions that cause the processor 110 to initiate hitchless towing. In one approach, the instructions to initiate hitchless towing include instructions to initiate a handshake process between a lead vehicle and the vehicle 100. The handshake process includes establishing a wireless connection for communicating (e.g., V2V, Wi-Fi®, etc.) between the lead vehicle and the vehicle 100. As such, the handshake process includes, in one embodiment, the control module 220 identifying a beacon transmitted from the lead vehicle. In one approach, the beacon is a hitchless towing request. The request may be generated using a human machine interface (HMI) within the lead vehicle, such as a display, button, switch, remote device, etc. within the lead vehicle that connects with a controller or other computational device to generate electronic signals. The control module 220 recognizes the beacon and attempts to establish a connection by sending a secure message including credentials of the vehicle 100. In one arrangement, the secure message includes an acceptance of the hitchless towing request. For example, the control module 220 may accept the request in response to a user within the vehicle 100 interacting with a user interface (UI) within the vehicle 100 (e.g., a user accepting the request on a display within the vehicle 100). A wireless connection is successfully established when the lead vehicle receives the secure message (i.e., the acceptance) from the control module 220 and responds thereto with, for example, a session key or other information in support of the communication link.

In response to initiating hitchless towing between the lead vehicle and the vehicle 100, the control module 220, in one approach generates a hitching path that provides a route from the vehicle 100 to the lead vehicle. The route includes, in one embodiment, one or more directions that, when executed by the vehicle 100, result in the vehicle 100 reaching and aligning with the lead vehicle. In one embodiment, the control module 220 determines an initial position and an initial orientation of the lead vehicle as well as an initial position and an initial orientation of the vehicle 100. The positions of the lead vehicle and the vehicle 100, in one approach, include the global positioning system (GPS) coordinates of the lead vehicle and the vehicle 100. As another example, the control module 220 may determine the positions of the lead vehicle and the vehicle 100 using simultaneous localization and mapping (SLAM) techniques. For example, the control module 220 may determine the positions of the lead vehicle and the vehicle 100 by developing a SLAM-based map, where the SLAM-based map is developed based on the sensor data 250 acquired by the vehicle 100.

The orientations of the lead vehicle and the vehicle 100, in one embodiment, include the directions the respective vehicles are facing (e.g., the front end of the lead vehicle is facing 45 degrees north at its current position, and the front end of the vehicle 100 is facing 20 degrees south at its current position). The orientations of the lead vehicle and the vehicle 100 may also include the directions the respective vehicles are facing relative to one another (e.g., the front end of the lead vehicle is facing 10 degrees north of the direction in which the front end of the vehicle 100 is facing). In one approach, the control module 220 determines the initial position and orientation of the lead vehicle by receiving GPS coordinates from the lead vehicle over the wireless communication link.

Alternatively, the control module 220 may determine the initial position and orientation of the lead vehicle by processing the sensor data 250. For example, the sensor data 250 may include image, radar, and/or LiDAR data associated with the lead vehicle, and as such, the control module 220, in one embodiment, determines the position and orientation of the lead vehicle by processing the sensor data 250. In one arrangement, the control module 220 determines the initial position and orientation of the vehicle 100 by acquiring and processing the sensor data 250 associated with the current position and orientation of the vehicle 100. For example, the sensor data 250 may include GPS data, image data, IMU data, steering wheel angle data, etc.

In any case, in one embodiment, the control module 220 generates the hitching path from the position of the vehicle 100 to the position of the lead vehicle. Further, in one approach, the control module 220 generates one or maneuvers for the vehicle 100 to adjust the orientation of the vehicle 100 to be a substantially similar orientation of the lead vehicle at the end of the hitching path. For example, maneuvers may include steering the vehicle 100 to a particular degree so that the front end of the vehicle 100 is facing a substantially similar direction as the front end of the lead vehicle at the end of the hitching path. A substantially similar direction includes, for example, a position in which the front ends of the lead vehicle and the vehicle 100 are facing a direction within 0-10 degrees of one another that is generally parallel.

In one configuration, the control module 220 determines physical constraints associated with the vehicle 100. The physical constraints include, for example, dimensions of the vehicle 100 and a turning radius of the vehicle 100. As an example, the dimensions of the vehicle 100 may include a width (e.g., six feet), a height (e.g., six feet from bottom of the tires of the vehicle 100 to the top of the roof of the vehicle 100), and a length (e.g., fifteen feet) of the vehicle 100. The turning radius of the vehicle 100 is, in one embodiment, the minimum diameter of available space required for the vehicle 100 to make a circular turn (e.g., a 10-meter radius). As previously described, the data store 230 includes, in one or more arrangements, the physical constraint data 240 about the vehicle 100, where the physical constraint data 240 is acquired from a pre-populated electronic source, such as an onboard data store or by processing the sensor data 250 to determine the physical constraints of the vehicle 100 based on how the vehicle 100 travels. Accordingly, in one embodiment, the control module 220 generates a kinematically feasible hitching path to comply with the physical constraints associated with the vehicle 100, where the kinematically feasible path is a path that the vehicle 100 can execute, given its physical constraints.

After generating the hitching path, in one approach, the control module 220 controls the vehicle 100 to travel the hitching path. In one embodiment, the control module 220 controls the vehicle 100 to execute the generated maneuvers associated with the hitching path (e.g., by controlling the steering, speed, direction of travel, etc. of the following vehicle). Further, the control module 220, in one arrangement, acquires sensor data 250 from one or more sensors of the vehicle 100 about the hitching path. The sensor data 250 includes, for example, image data associated with the hitching path. As such, in one embodiment, the control module 220 processes the sensor data 250 to identify one or more obstacles (e.g., other vehicles, buildings, plants, pedestrians, etc.) on the hitching path.

In one approach, the control module 220 processes the sensor data 250 by using a machine learning algorithm embedded within the control module 220, such as a convolutional neural network (CNN) or another suitable processing routine, to perform semantic segmentation over the sensor data 250 from which information about the one or more obstacles is derived. Of course, in further aspects, the control module 220 may employ different machine learning algorithms or implements different approaches for performing the associated functions, which can include deep convolutional encoder-decoder architectures, or another suitable approach that generates information about the separate objects represented in the sensor data 250. Whichever particular approach the control module 220 implements, the control module 220 provides an output with identifying obstacles represented in the sensor data 250. In this way, the control module 220 identifies obstacles on the hitching path.

In one embodiment, the control module 220 controls the vehicle 100 to avoid the one or more obstacles on the hitching path. For example, the control module 220 may control the vehicle 100 to avoid an obstacle on the hitching path by controlling the vehicle 100 to perform an evasive maneuver. An evasive maneuver includes, for example, applying the brakes of the vehicle 100, stopping the vehicle 100, controlling the vehicle 100 to steer around an obstacle, etc. In one embodiment, the control module 220 controls the vehicle 100 to perform an evasive maneuver using an advanced driver assistance system (ADAS) of the vehicle 100.

In one configuration, the sensor data 250 captured by the one or more sensors of the vehicle 100 is streamed on a display of the lead vehicle and/or the vehicle 100 (e.g., a video stream is displayed on a display within the lead vehicle and/or the vehicle 100). Accordingly, a user may observe the path of the vehicle 100 and identify obstacles that may intersect with the vehicle 100 as the vehicle 100 travels on the hitching path. In one embodiment, the control module 220 stops the vehicle 100 from moving in response to a user inputting a command to stop the vehicle 100 using, for example, an HMI (e.g., by interacting with a virtual stop button on a display within the lead vehicle and/or the vehicle 100). In any case, the control module 220, in one or more arrangements, causes the vehicle 100 to avoid obstacles on the hitching path autonomously (e.g., using an ADAS system) or based on manual inputs from a user.

After the vehicle 100 reaches the end of the hitching path, the control module 220, in one approach, aligns the vehicle 100 with the lead vehicle. In one approach, the system aligns the vehicle 100 with the lead vehicle by positioning the vehicle 100 behind the lead vehicle in a substantially similar orientation as the lead vehicle. To align the vehicle 100, the control module 220, in one embodiment, determines the state of the lead vehicle (i.e., whether the lead vehicle is stationary or moving). The control module 220, in one embodiment, determines the state of the lead vehicle by processing the sensor data 250 (e.g., image data, radar data, and/or LiDAR data) about the lead vehicle. For example, the control module 220 may determine the lead vehicle is stationary if the control module 220 determines that the radar data about the lead vehicle indicates that the distance between the vehicle 100 and the lead vehicle continuously decreases as the vehicle 100 travels on the hitching path. On the other hand, the control module 220 may determine that the lead vehicle is moving if the radar data is indicative of the distance between the vehicle 100 and the lead vehicle increasing as the vehicle 100 travels on the hitching path. Alternatively, the control module 220 may determine the state of the lead vehicle via communications received from the lead vehicle. For example, the lead vehicle may communicate its current speed and position (i.e., GPS coordinates) to the vehicle 100 over the wireless communication link as the vehicle 100 travels on the hitching path.

In any case, the control module 220, in one approach, determines that the lead vehicle is stationary and aligns the vehicle 100 with the lead vehicle by controlling the vehicle 100 to move behind an initial position of the lead vehicle in a substantially similar orientation as the lead vehicle. As previously discussed, the control module 220, in one embodiment, controls the vehicle 100 to move behind an initial position of the lead vehicle in a substantially similar orientation as the lead vehicle by controlling the vehicle 100 to travel the hitching path and execute one or more maneuvers.

In a similar manner, the control module 220 may determine that the lead vehicle is moving as the vehicle 100 travels the hitching path instead of remaining stationary. To allow the vehicle 100 to reach the lead vehicle before the lead vehicle travels too far (e.g., 1 mile away), the lead vehicle may limit its speed (e.g., limits its speed to a creep speed) so that the vehicle 100 can effectively reach the current position of the lead vehicle. Responsive to determining the lead vehicle is moving, the control module 220, in one embodiment, controls the vehicle 100 to travel to an end of the hitching path. To successfully align with the lead vehicle, the control module 220 receives a path history from the lead vehicle via the established wireless communication link. The path history is, in one embodiment, the route the lead vehicle has taken since the control module 220 generated the hitching path (i.e., the route from the initial position of the lead vehicle to the current position of the lead vehicle). In this way, the control module 220, can control the vehicle 100 to reach the current position of the lead vehicle by controlling the vehicle 100 to follow the path history after the vehicle 100 reaches the end of the hitching path. In one configuration, the control module 220 aligns the vehicle 100 with the moving lead vehicle by controlling the vehicle 100 to move behind the lead vehicle (i.e., by reaching the end of the hitching path and subsequently following the path history of the lead vehicle) in a substantially similar orientation as the lead vehicle.

After aligning the vehicle 100 with the lead vehicle, the control module 220, in one embodiment, controls the vehicle 100 to perform the hitchless towing by following the lead vehicle without a physical connection. That is, the control module 220, in one arrangement, controls the vehicle 100 to maintain a defined distance behind the lead vehicle and to follow a trajectory of the lead vehicle. In this way, the vehicle 100 can automatically follow the lead vehicle without the constraints of a physical connection, such as a hitch. At the same time, hitchless towing allows the vehicle 100 to travel closely to the lead vehicle, thereby minimizing the chances of another vehicle coming between the vehicle 100 and the lead vehicle as the vehicle 100 and the lead vehicle travel. The defined distance is, for example, the shortest distance between the lead vehicle and the vehicle 100 that allows the vehicle 100 to follow the lead vehicle without a risk of colliding with the lead vehicle. The defined distance may be preset by a user. For example, a user may enter the defined distance on an HMI, or the user may select a defined distance from a list of defined distances (e.g., 5 feet, 10 feet, 15 feet) and accordingly, the control module 220 controls the vehicle 100 to maintain the user-defined distance during hitchless towing. As another example, the control module 220 may automatically determine the defined distance based on the physical constraints and operating parameters of the vehicle 100.

In one approach, the control module 220 determines a trajectory of the lead vehicle. The control module 220 can determine the trajectory of the lead vehicle in different ways, including, receiving the explicit trajectory from the lead vehicle. The control module 220 may acquire the trajectory from the lead vehicle over the wireless communication link. For example, the control module 220 may receive communications from the lead vehicle indicative of the lead vehicle's intention to continue driving straight at 50 miles per hour (mph). In another example, the control module 220 derives the trajectory independently by processing the sensor data 250 associated with the lead vehicle. For example, the control module 220 may determine the trajectory of the lead vehicle by identifying the speed, direction of travel, and environmental conditions (e.g., the lead vehicle using a turn signal, the lead vehicle approaching a stoplight, the lead vehicle driving in an exit lane, etc.) associated with the lead vehicle from the sensor data 250. As an example, the control module 220 may determine that the lead vehicle is in a right-turn lane with a right-turn signal on, and decelerating. After acquiring the trajectory of the lead vehicle, the control module 220 controls the vehicle 100 to follow the trajectory without a physical connection to the lead vehicle by executing maneuvers that allow the vehicle 100 to imitate the movements of the lead vehicle. In this way, the hitching system improves the process of initiating hitchless towing between a lead vehicle and following vehicle.

Figure 3:
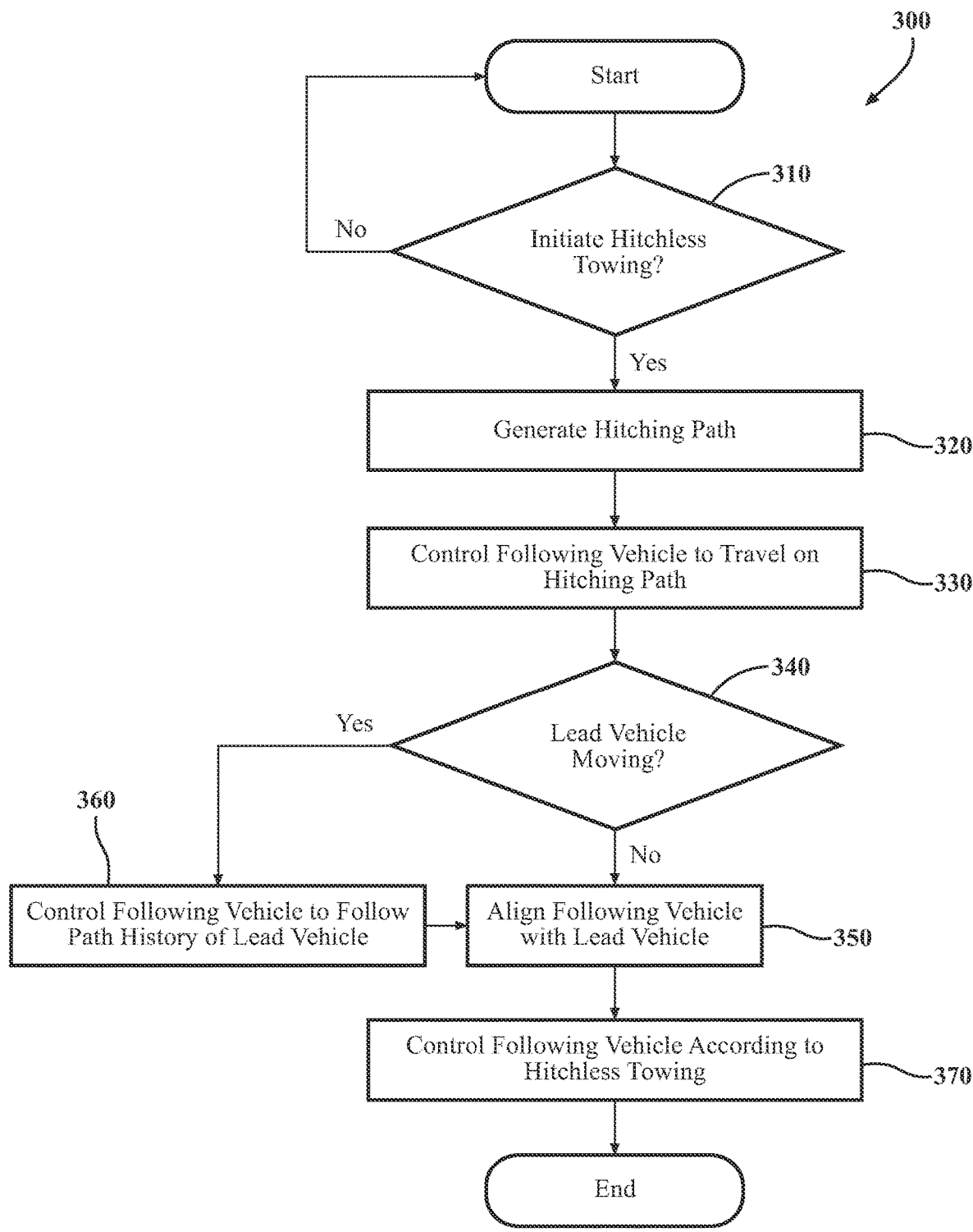
FIG. 3 illustrates one embodiment of a method that is associated with improving hitchless towing between a lead and following vehicle.

Additional aspects of improving hitchless towing will be discussed in relation to FIG. 3. FIG. 3 illustrates a flowchart of a method 300 that is associated with improving the process of initiating hitchless towing between a lead and following vehicle. Method 300 will be discussed from the perspective of the hitching system 170 of FIGS. 1, and 2. While method 300 is discussed in combination with the hitching system 170, it should be appreciated that the method 300 is not limited to being implemented within the hitching system 170 but is instead one example of a system that may implement the method 300.

At 310, the control module 220 determines whether to initiate hitchless towing. As previously discussed, initiating hitchless towing includes, in one approach, using a handshake process. In one embodiment, the control module 220 determines whether to initiate hitchless towing responsive to receiving a request to initiate hitchless towing from a lead vehicle. For example, the control module 220 may receive a request to initiate hitchless towing responsive to the lead vehicle sending the request (e.g., by the user interacting with a display, button, switch, remote device, etc.). Responsive to receiving the request to initiate hitchless towing, the control module 220 may prompt a user of the vehicle 100 to accept or deny the request on a UI (e.g., a display that connects with a controller or other computational device to generate electronic signals) of the vehicle 100.

In one approach, the control module 220 does not initiate hitchless towing if the control module 220 receives an electronic signal generated via inputs on, for example, a UI indicative of a user denying the request. Alternatively, in one arrangement, the control module 220 may automatically deny a request to initiate hitchless towing based on user preferences. For example, the data store 230 may store user preferences about lead vehicles that are permitted/prohibited to initiate hitchless towing with the vehicle 100. Accordingly, as an example, if the control module 220 receives a request from a prohibited lead vehicle, the control module 220, in one embodiment, denies the request and does not initiate hitchless towing.

On the other hand, the control module 220, in one configuration initiates hitchless towing in response to receiving an electronic signal generated via inputs on a UI indicative of a user accepting the request. Alternatively, the control module 220 may automatically initiate hitchless towing if the request is received from a permitted vehicle. If the control module 220 does not initiate hitchless towing, the control module 220 monitors for subsequent requests. Otherwise, the control module 220 generates a hitching path for the vehicle 100 to execute as described in step 320.

At 320, the control module 220 generates a hitching path that provides a route from the vehicle 100 to the lead vehicle. The route includes, in one embodiment, one or more directions that, when executed by the vehicle 100, result in the vehicle 100 reaching and aligning with the lead vehicle. In one embodiment, the control module 220 determines an initial position and an initial orientation of the lead vehicle and an initial position and an initial orientation of the vehicle 100. In one approach, the control module 220 determines the initial position and orientation of the vehicle 100 and the lead vehicle based on the GPS coordinates of the vehicle 100 and the lead vehicle or by using a SLAM-based map. The orientations of the lead vehicle and the vehicle 100, in one embodiment, include the directions the respective vehicles are positioned in (e.g., the front end of the lead vehicle is facing 45 degrees north at its current position, and the front end of the vehicle 100 is facing 20 degrees south at its current position). In one approach, the control module 220 receives the initial position and orientation of the lead vehicle over the wireless communication link, where the initial position and orientation include GPS coordinates and a heading direction of the lead vehicle. Alternatively, the control module 220 may determine the initial position and orientation of the lead vehicle by processing the sensor data 250. For example, the sensor data 250 may include image, radar, and/or LiDAR data associated with the lead vehicle, and as such, the control module 220. In one arrangement, the control module 220 determines the initial position and orientation of the vehicle 100 by acquiring and processing the sensor data 250 associated with the current position and orientation of the vehicle 100. For example, the sensor data 250 may include GPS data, image data, IMU data, steering wheel angle data, etc.

In any case, in one embodiment, the control module 220 generates the hitching path from the position of the vehicle 100 to the position of the lead vehicle. The hitching path includes, in one approach, one or maneuvers for the vehicle 100 to adjust the orientation of the vehicle 100 to be a substantially similar orientation of the lead vehicle at the end of the hitching path. For example, the control module 220 may generate steering maneuvers for the vehicle 100 to execute along the hitching path so that the front end of the vehicle 100 is facing a substantially same direction as the front end of the lead vehicle at the end of the hitching path.

In one configuration, the control module 220 determines physical constraints associated with the vehicle 100. The physical constraints include, for example, dimensions of the vehicle 100 and a turning radius of the vehicle 100. As an example, the dimensions of the vehicle 100 may include a width (e.g., six feet), a height (e.g., six feet from bottom of the tires of the vehicle 100 to the top of the roof of the vehicle 100), and a length (e.g., fifteen feet) of the vehicle 100. The turning radius of the vehicle 100 is, in one embodiment, the minimum diameter of available space required for the vehicle 100 to make a circular turn (e.g., a 10-meter radius). As previously described, the data store 230 includes, in one or more arrangements, the physical constraint data 240 about the vehicle 100, where the physical constraint data 240 is acquired from a lookup table, which may be preconfigured by an original equipment manufacturer (OEM) when the vehicle is originally provisioned or by processing the sensor data 250 to determine the physical constraints of the vehicle 100 based on how the vehicle 100 travels. In one approach, the control module 220 determines the physical constraints of the vehicle 100 by processing IMU data of the vehicle 100. For example, IMU data may include historical steering wheel angle data of the vehicle 100. Accordingly, based on the steering capabilities of the vehicle 100, as indicated by the IMU data, the control module 220 can determine the turning radius of the vehicle 100. In one approach, the control module 220 may determine the dimensions of the vehicle 100 by processing image, radar, and/or LiDAR data captured by sensors of the vehicle 100. For example, sensor data may indicate a height and width of the vehicle 100 (e.g., radar data may indicate the distance between the body of the vehicle 100 and structures of known heights and widths). In any case, in one embodiment, the control module 220 generates a kinematically feasible hitching path to comply with the physical constraints associated with the vehicle 100, where the kinematically feasible path is a path that the vehicle 100 can execute, given its physical constraints. For example, the kinematically feasible hitching path includes maneuvers that do not violate the maximum turning radius of the vehicle 100 and paths that accommodate the width/height of the vehicle 100.

At 330, the control module 220 controls the vehicle 100 to travel on the hitching path. In one approach, the control module 220 causes the vehicle 100 to travel the hitching path by controlling the vehicle 100 to execute the generated maneuvers on the hitching path by controlling operating parameters of the vehicle 100. Operating parameters include, for example, steering, braking, accelerating, decelerating, etc. Further, in one approach, the control module 220 acquires sensor data 250 from one or more sensors of the vehicle 100 about the hitching path. The sensor data 250 includes, for example, image data associated with the hitching path. As such, in one embodiment, the control module 220 processes the sensor data 250 to identify one or more obstacles (e.g., other vehicles, buildings, plants, pedestrians, etc.) on the hitching path.

In one approach, the control module 220 processes the sensor data 250 by using a machine learning algorithm embedded within the control module 220, such as a CNN or another suitable processing routine, to perform semantic segmentation over the sensor data 250 from which information about the one or more obstacles is derived. Of course, in further aspects, the control module 220 may employ different machine learning algorithms or implements different approaches for performing the associated functions, which can include deep convolutional encoder-decoder architectures, or another suitable approach that generates information about the separate objects represented in the sensor data 250. Whichever particular approach the control module 220 implements, the control module 220 provides an output with identifying obstacles represented in the sensor data 250. In this way, the control module 220 identifies obstacles on the hitching path.

In one embodiment, the control module 220 may process the image data to identify one or more obstacles on the hitching path. The control module 220, in one configuration, controls the vehicle 100 to avoid the one or more identified obstacles on the hitching path. For example, the control module 220 may control the vehicle 100 to avoid an obstacle on the hitching path by controlling the vehicle 100 to automatically perform an evasive maneuver using, for example, an ADAS of the vehicle 100 (e.g., automatic emergency braking). An evasive maneuver includes, for example, applying the brakes of the vehicle 100, stopping the vehicle 100, controlling the vehicle 100 to steer around an obstacle, etc. in a manner sufficient to avoid the one or more obstacles.

In one approach, the control module 220 can control the vehicle 100 to avoid obstacles responsive to receiving user inputs. For example, in one configuration, the sensor data 250 is video data captured by the one or more sensors of the vehicle 100. In one arrangement, the video data is streamed on a display of the lead vehicle and/or the vehicle 100. Accordingly, a user may observe the path of the vehicle 100 and identify obstacles that may intersect with the vehicle 100 as the vehicle 100 travels on the hitching path via the display. In one embodiment, the control module 220 stops the vehicle 100 from moving in response to a user inputting a command to stop the vehicle 100 using, for example, an HMI. As an example, the vehicle 100 and/or the lead vehicle may include a display with an electronic stop (e-stop) button. If a user observes an obstacle on the hitching path, the user may interact with (i.e., touch) the e-stop button, and in response, the control module 220 controls the vehicle 100 to come to a stop.

At 340, the control module 220 determines whether the lead vehicle is moving as the vehicle 100 travels on the hitching path. In one embodiment, the control module 220 determines whether the lead vehicle is moving by receiving communications related to the state of the lead vehicle over the wireless communication link. For example, the lead vehicle may communite the current speed and GPS coordinates of the lead vehicle. If the speed of the lead vehicle is non-zero and/or if the GPS coordinates are changing, the control module 220 may determine that the lead vehicle is moving. On the other hand, if the speed of the lead vehicle is zero and/or the GPS coordinates of the lead vehicle are static, the control module 220 may determine that the lead vehicle is not moving (i.e., stationary). In one approach, the control module 220 determines whether the lead vehicle is moving by processing the sensor data 250 about the lead vehicle. The sensor data 250 may include image data, radar data, and LiDAR data, for example. As previously discussed, the sensor data 250 may be processed using various machine learning techniques. As an example, the control module 220 may determine that the lead vehicle is moving if the radar data indicates that the distance between the lead vehicle and the vehicle 100 is increasing as the vehicle 100 travels on the hitching path. On the other hand, if the radar data indicates that the distance between the lead vehicle and the vehicle 100 is decreasing as the vehicle 100 travels on the hitching path, the control module 220 may determine that the lead vehicle is not moving. As another example, the control module 220 may determine that the lead vehicle is moving if the image data indicates that the lead vehicle moves positions as the vehicle 100 travels on the hitching path. In any case, responsive to determining that the lead vehicle is stationary, the method 300 continues to step 350, where the control module 220 aligns the vehicle 100 with the lead vehicle. Otherwise, the method 300 proceeds to step 360, where the control module 220 controls the vehicle 100 to follow the path history of the lead vehicle.

At 350, responsive to determining the lead vehicle is stationary, the control module 220, in one embodiment, aligns the vehicle 100 with the lead vehicle. In one approach, the control module 220 aligns the vehicle 100 with the lead vehicle by controlling the vehicle 100 to move behind an initial position of the lead vehicle in a substantially similar orientation as the lead vehicle. A substantially similar orientation includes, for example, a position in which the front ends of the lead vehicle and the vehicle 100 are facing a direction within 0-10 degrees of one another that is generally parallel. As previously discussed, the control module 220, in one embodiment, controls the vehicle 100 to move behind an initial position of the lead vehicle in a substantially similar orientation as the lead vehicle by controlling the vehicle 100 to travel the hitching path and execute one or more maneuvers that result in the vehicle 100 moving behind the lead vehicle in a substantially similar orientation. In one arrangement, the control module 220 brings the vehicle 100 to a complete stop behind the lead vehicle when the vehicle 100 reaches a position that is a predetermined distance behind the lead vehicle (e.g., five feet).

At 360, responsive to determining that the lead vehicle is moving, the control module 220, in one configuration, controls the vehicle 100 to follow path history of the lead vehicle. Path history of the lead vehicle is, in one embodiment, the route the lead vehicle has taken since the control module 220 generated the hitching path (i.e., the route from the initial position of the lead vehicle to the current position of the lead vehicle). In one arrangement, the control module 220 receives a path history from the lead vehicle via the established wireless communication link. In response to receiving the path history, the control module 220, in one approach, controls the vehicle 100 to reach the current position of the lead vehicle by controlling the vehicle 100 to follow the path history after the vehicle 100 reaches the end of the hitching path. Subsequently, the method proceeds to step 350. At 350, the control module 220, in one configuration, aligns the vehicle 100 with the moving lead vehicle by controlling the vehicle 100 to move behind the lead vehicle (i.e., by reaching the end of the hitching path and subsequently following the path history of the lead vehicle) in a substantially similar orientation as the lead vehicle. The control module 220 aligns the vehicle 100 with the lead vehicle when, in one configuration, the vehicle 100 is a predetermined distance behind and in a substantially similar orientation as the lead vehicle.

At 370, the control module 220 controls the vehicle 100 to perform hitchless towing. Hitchless towing is, in one approach, a manner of controlling the vehicle 100 to follow the lead vehicle without a physical connection. That is, the control module 220, in one arrangement, controls the vehicle 100 to maintain a defined distance behind the lead vehicle and to follow a trajectory of the lead vehicle. The defined distance is, for example, the shortest distance between the lead vehicle and the vehicle 100 that allows the vehicle 100 to follow the lead vehicle without a risk of colliding with the lead vehicle. The control module 220 may control the vehicle 100 to follow the lead vehicle at a user-defined distance. For example, a user may enter the defined distance on an HMI, or the user may select a defined distance from a list of defined distances (e.g., 5 feet, 10 feet, 15 feet) and accordingly, the control module 220 controls the vehicle 100 to maintain the user-defined distance during hitchless towing. As another example, the control module 220 may automatically determine the defined distance based on the physical constraints and operating parameters of the vehicle 100.

In one approach, the control module 220 controls the vehicle 100 to perform hitchless towing by determining a trajectory of the lead vehicle. The control module 220 can determine the trajectory of the lead vehicle in different ways, including, receiving the explicit trajectory from the lead vehicle. The control module 220, in one configuration, receives the trajectory from the lead vehicle over the wireless communication link. For example, the control module 220 may receive communications from the lead vehicle indicative of upcoming maneuvers the lead vehicle plans to execute. For example, maneuvers may include driving straight, turning, merging into a lane, speeding up, slowing down, stopping, etc. As another example, the control module 220 can determine the trajectory by processing the sensor data 250 associated with the lead vehicle. For example, the control module 220 may determine the trajectory of the lead vehicle by identifying the speed, direction of travel, and environmental conditions (e.g., the lead vehicle using a turn signal, the lead vehicle approaching a stoplight, the lead vehicle driving in an exit lane, etc.) associated with the lead vehicle from the sensor data 250 acquired from the one or more sensors of the vehicle 100. As an example, the control module 220 may determine that the lead vehicle is in a right-turn lane with a right-turn signal on, and decelerating. As such, the control module 220 may cause the vehicle 100 to turn right when the vehicle 100 reaches the position of the lead vehicle. In any case, the control module 220 controls the vehicle 100 to follow the trajectory of the lead vehicle without a physical connection to the lead vehicle by executing maneuvers that allow the vehicle 100 to imitate the movements of the lead vehicle. In this way, the hitching system improves the process of initiating hitchless towing between a lead vehicle and following vehicle by providing a kinematically feasible path for the following vehicle to reach and align with a lead vehicle. This provides for a simplified towing process that avoids difficulties with hitching and aligning physical components between two vehicles thereby improving the user experience while reducing hardware malfunctions.

Figure 4:
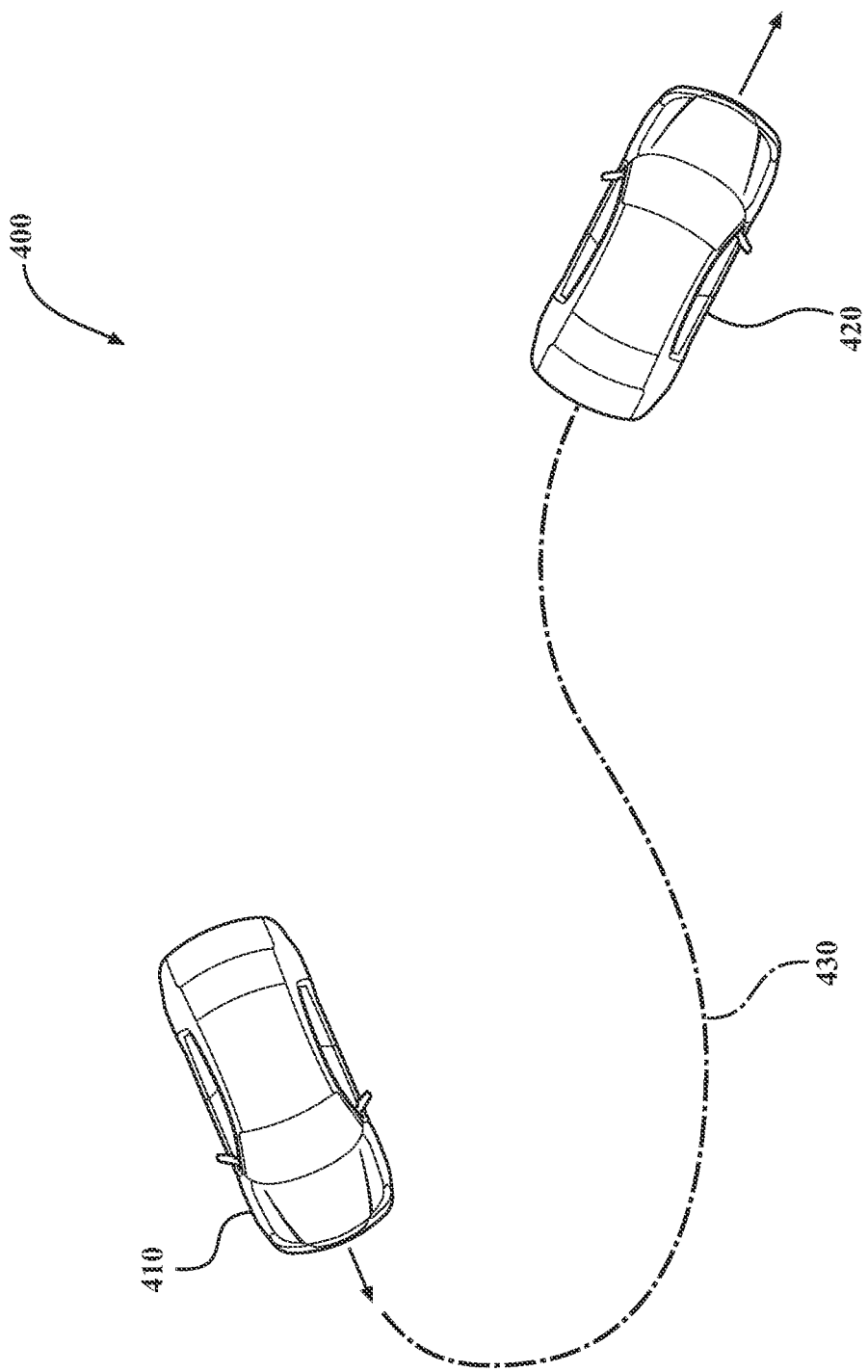
FIG. 4 illustrates one embodiment of a hitching path between a following vehicle and lead vehicle.

As a further explanation of how the hitching system improves the process of initiating hitchless towing between a lead vehicle and a following vehicle, the discussion will now shift to FIG. 4. FIG. 4 illustrates one embodiment 400 of a following vehicle 410, a lead vehicle 420, and a hitching path 430 between the following vehicle 410 and the lead vehicle 420. Responsive to initiating hitchless towing, the hitching system 170, in one approach generates the hitching path 430 from the initial position of the following vehicle 410 to the lead vehicle 420. The hitching system 170, in one embodiment, generates the shortest kinematically feasible route between the following vehicle 410 and the lead vehicle 420 as the hitching path 430. As previously described, a kinematically feasible path is a path that the following vehicle 410 is capable of executing given its physical constraints (e.g., dimensions and turning radius). As shown, the initial orientations of the following vehicle 410 and the lead vehicle 420 are different from one another (i.e., the following vehicle 410 and the lead vehicle 420 are facing different directions in relation to one another). Accordingly, the hitching path 430 includes curves which represent points at which the hitching system 170 causes the following vehicle 410 to excute steering maneuvers so that the following vehicle 410 can reach the end of the hitching path 430 in a substantially similar orientation as the lead vehicle 420. As illustrated, the hitching path 430 ends at a position which, when executed by the following vehicle 410 causes the following vehicle 410 to move behind the lead vehicle 420 in a substantially similar orientation as the lead vehicle.

Figure 5A:
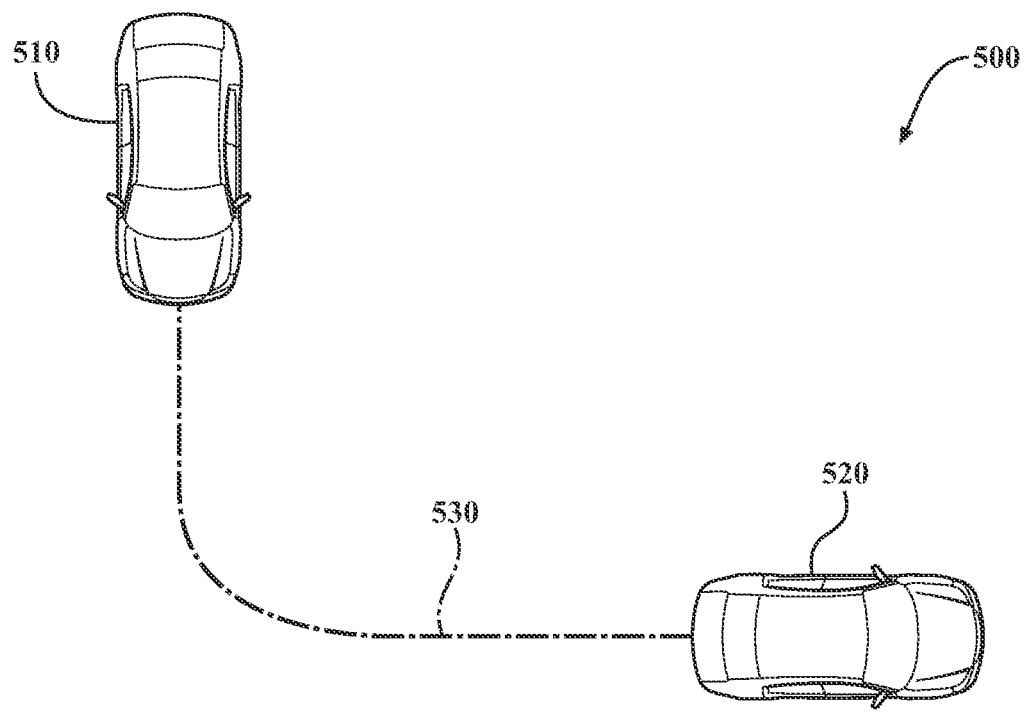
FIGS. 5A-5D illustrate an example sequence of a following vehicle aligning with and virtually hitching to a lead vehicle that is moving.
Figure 5B:
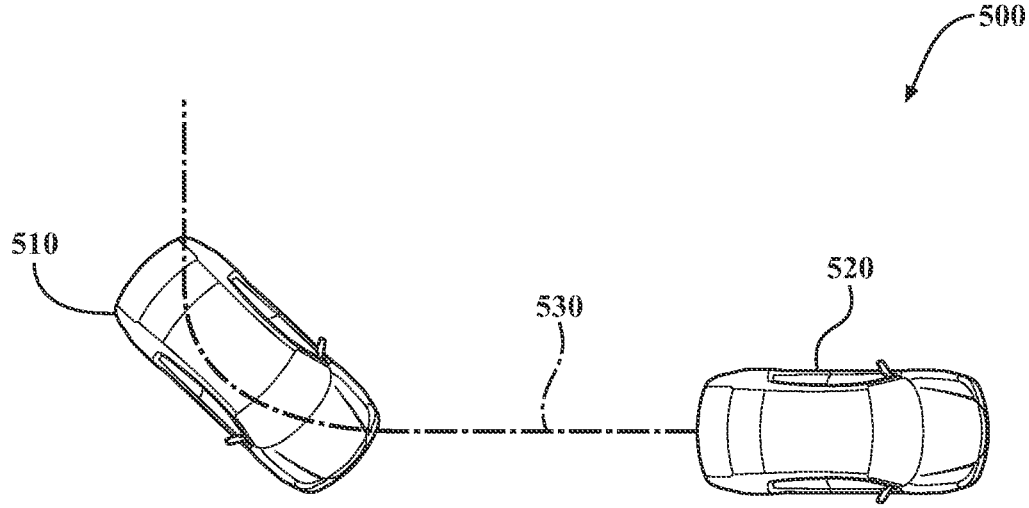
Figure 5C:
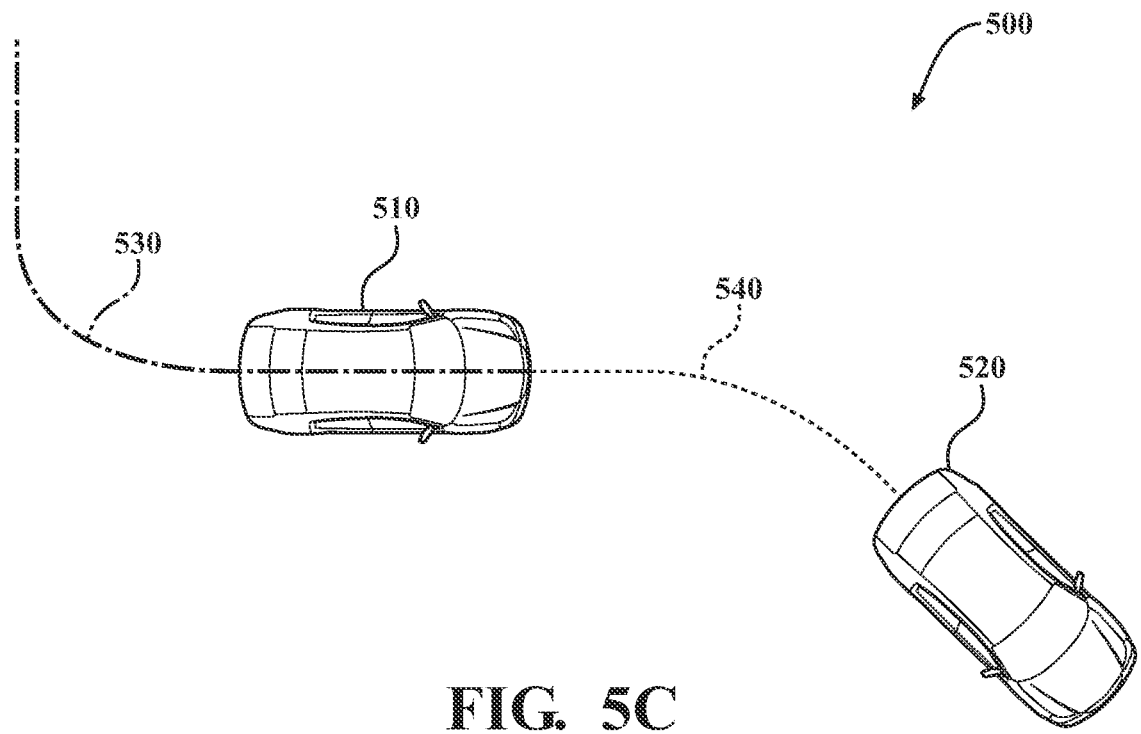
Figure 5D:
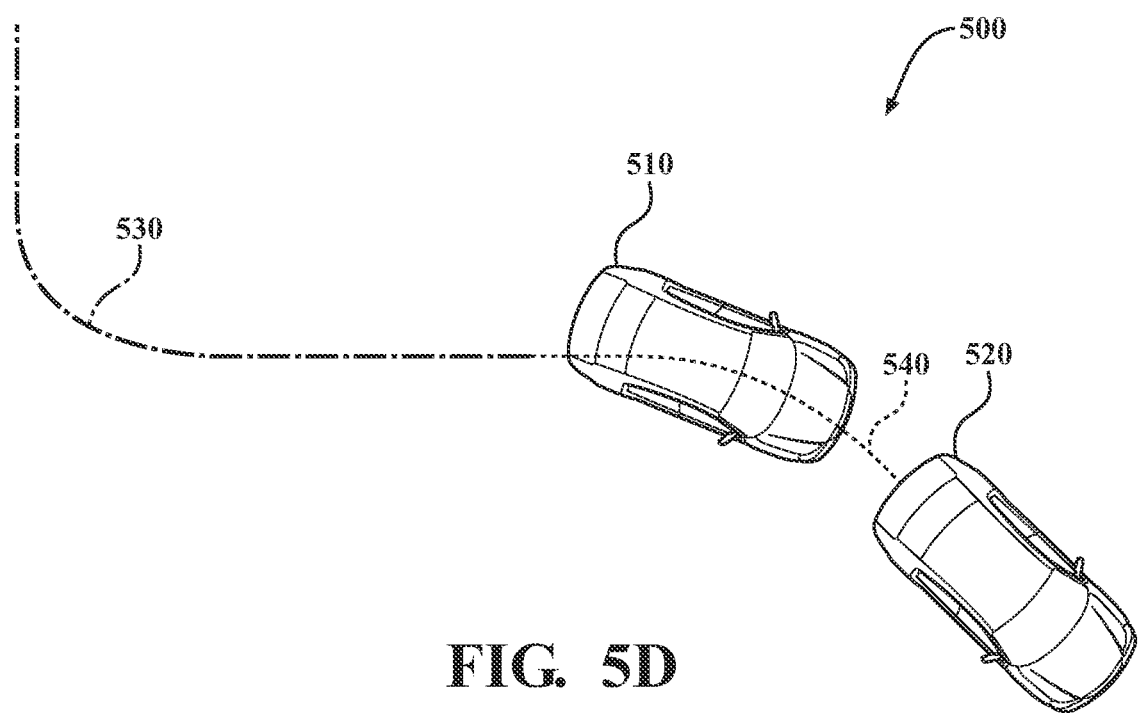

Referring to FIGS. 5A-5D, an example sequence 500 of a following vehicle aligning with and virtually hitching to a moving lead vehicle is illustrated. FIG. 5A represents a point in time (t=0 seconds). At t=0 seconds, as shown, a following vehicle 510 and a lead vehicle 520 are located at two different initial positions. At t=0 seconds, the hitching system 170 generates hitching path 530 between the initial position of the following vehicle 510 and the lead vehicle 520. As shown in FIG. 5A, the following vehicle 510 and the lead vehicle 520 are initially positioned in different orientations from one another. FIG. 5B represents a subsequent point in time (t=2 seconds) at which time the hitching system 170 controls the following vehicle 510 to travel on the hitching path 530. At t=2 seconds, the lead vehicle 520 is stationary. FIG. 5C represents a subsequent point in time (t=4 seconds) at which the following vehicle 510 reaches the end of the hitching path. Further, at t=4 seconds, the lead vehicle 520 is moving (i.e., the lead vehicle 520 moved from its initial position at the end of the hitching path 530), thereby generating a path history 540, which represents the route the lead vehicle 520 has taken since t=0 seconds. FIG. 5D represents a subsequent point in time (t=6 seconds) at which the following vehicle 510 has traversed the path history 540 to move behind the lead vehicle 520 in a substantially similar orientation as the lead vehicle 520. In other words, at t=6 seconds, the following vehicle 510 is aligned with the lead vehicle 520. In this way, the hitching system 170 improves virtually hitching and aligning a following vehicle to a lead vehicle.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in only a subset of possible modes.

In one or more embodiments, the vehicle 100 is an autonomous vehicle. As used herein, "autonomous vehicle" refers to a vehicle that is capable of operating in an autonomous mode (e.g., category 5, full automation). "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), and application specific integrated circuit (ASIC), a microprocessor, etc. The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, and hard drives. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of each of the following: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the hitching system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement of the vehicle 100. The processor(s) 110, the hitching system 170, and/or the autonomous driving module(s) 160 may control some or all of the vehicle systems 140 and, thus, may be partially or fully autonomous as defined by SAE 0 to 5.

The processor(s) 110, the hitching system 170, and/or the autonomous driving module(s) 160 can be operatively connected to communicate with the various vehicle systems 140 and/or individual components thereof. For example, returning to FIG. 1, the processor(s) 110, the hitching system 170, and/or the autonomous driving module(s) 160 can be in communication to send and/or receive information from the various vehicle systems 140 to control the movement. of the vehicle 100. The processor(s) 110, the hitching system 170, and/or the autonomous driving module(s) 160 may control some or all of the vehicle systems 140.

The processor(s) 110, the hitching system 170, and/or the autonomous driving module(s) 160 may be operable to control the navigation and maneuvering of the vehicle 100 by controlling one or more of the vehicle systems 140 and/or components thereof. For instance, when operating in an autonomous mode, the processor(s) 110, the hitching system 170, and/or the autonomous driving module(s) 160 can control the direction and/or speed of the vehicle 100. The processor(s) 110, the hitching system 170, and/or the autonomous driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be element or combination of elements operable to alter one or more of the vehicle systems 140 or components thereof to responsive to receiving signals or other inputs from the processor(s) 110 and/or the autonomous driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the hitching system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the control module 220. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 2-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A hitching system comprising:
   one or more processors; and
   a memory communicably coupled to the one or more processors and storing instructions that, when executed by the one or more processors, cause the one or more processors to:
      responsive to initiating hitchless towing between a lead vehicle and a following vehicle, generate a hitching path that provides a route from the following vehicle to the lead vehicle, including generating the hitching path as a kinematically feasible hitching path to comply with physical constraints associated with the following vehicle indicating a turning radius and dimensions of the following vehicle;
      control the following vehicle to travel the hitching path, including instructions to align the following vehicle with the lead vehicle to configure the lead vehicle and the following vehicle for hitchless towing by, responsive to determining the lead vehicle is moving, i) controlling the following vehicle to travel the hitching path, ii) controlling the following vehicle to follow a path history of the lead vehicle from a time prior to the following vehicle being towed, iii) controlling the following vehicle to orient itself in a similar orientation as the lead vehicle; and
      control the following vehicle to perform the hitchless towing by following the lead vehicle without a physical connection.

2. The hitching system of claim 1, wherein the instructions to align the following vehicle with the lead vehicle include instructions to:
   determine that the lead vehicle is stationary as the following vehicle travels the hitching path; and
   control the following vehicle to move behind an initial position of the lead vehicle in a similar orientation as the lead vehicle.

3. The hitching system of claim 1, wherein the instructions to control the following vehicle to follow a path history of the lead vehicle including instructions to control the following vehicle to follow a sequence of points defined by the path history.

4. The hitching system of claim 1, wherein the instructions to control the following vehicle to follow the hitching path include instructions to:
   acquire sensor data from one or more sensors of the following vehicle about the hitching path;
   process the sensor data to identify one or more obstacles on the hitching path; and
   control the following vehicle to avoid the one or more obstacles on the hitching path.

5. The hitching system of claim 1, wherein the instructions to initiate hitchless towing include instructions to:
   initiate a handshake process between the lead vehicle and the following vehicle, wherein the handshake process includes:
   receiving a hitchless towing request from the lead vehicle;
   accepting the hitchless towing request; and
   establishing a wireless communication link between the lead vehicle and the following vehicle.

6. The hitching system of claim 1, wherein the instructions to generate the hitching path include instructions to:
   determine the physical constraints associated with the following vehicle, including the dimensions of the following vehicle and the turning radius of the following vehicle.

7. The hitching system of claim 1, wherein the instructions to generate the hitching path include instructions to:
   determine a position and an orientation of the lead vehicle and a position and an orientation of the following vehicle;
   generate the hitching path from the position of the following vehicle to the position of the lead vehicle; and
   generate one or maneuvers for the following vehicle to adjust the orientation of the following vehicle to be a similar orientation of the lead vehicle by steering the following vehicle to a particular degree so that a front end of the following vehicle is facing a similar direction as a front end of the lead vehicle.

8. The hitching system of claim 1, wherein the instructions to control the following vehicle to perform the hitchless towing include instructions to:
  determine a trajectory of the lead vehicle; and
  control the following vehicle to follow the trajectory.

9. A non-transitory computer-readable medium including instructions that when executed by one or more processors cause the one or more processors to:
  responsive to initiating hitchless towing between a lead vehicle and a following vehicle, generate a hitching path that provides a route from the following vehicle to the lead vehicle, including generating the hitching path as a kinematically feasible hitching path to comply with physical constraints associated with the following vehicle indicating a turning radius and dimensions of the following vehicle;
  control the following vehicle to travel the hitching path, including instructions to align the following vehicle with the lead vehicle to configure the lead vehicle and the following vehicle for hitchless towing by, responsive to determining the lead vehicle is moving, i) controlling the following vehicle to travel the hitching path, ii) controlling the following vehicle to follow a path history of the lead vehicle from a time prior to the following vehicle being towed, iii) controlling the following vehicle to orient itself in a similar orientation as the lead vehicle; and
  control the following vehicle to perform the hitchless towing by following the lead vehicle without a physical connection.

10. The non-transitory computer-readable medium of claim 9, wherein the instructions to align the following vehicle with the lead vehicle include instructions to:
  determine that the lead vehicle is stationary as the following vehicle travels the hitching path; and
  control the following vehicle to move behind an initial position of the lead vehicle in a similar orientation as the lead vehicle.

11. The non-transitory computer-readable medium of claim 9, wherein the instructions to control the following vehicle to follow a path history of the lead vehicle include instructions to control the following vehicle to follow a sequence of points defined by the path history.

12. The non-transitory computer-readable medium of claim 9, wherein the instructions to generate the hitching path include instructions to:
  determine physical constraints associated with the following vehicle, including at least one of: dimensions of the following vehicle and a turning radius of the following vehicle; and
  generate a kinematically feasible hitching path to comply with the physical constraints associated with the following vehicle.

13. The non-transitory computer-readable medium of claim 9, wherein the instructions to generate the hitching path include instructions to:
  determine a position and an orientation of the lead vehicle and a position and an orientation of the following vehicle;
  generate the hitching path from the position of the following vehicle to the position of the lead vehicle; and
  generate one or maneuvers for the following vehicle to adjust the orientation of the following vehicle to be similar orientation of the lead vehicle.

14. A method, comprising:
  in response to initiating hitchless towing between a lead vehicle and a following vehicle, generating a hitching path that provides a route from the following vehicle to the lead vehicle, including generating the hitching path as a kinematically feasible hitching path to comply with physical constraints associated with the following vehicle indicating a turning radius and dimensions of the following vehicle;
  controlling the following vehicle to travel the hitching path, including aligning the following vehicle with the lead vehicle to configure the lead vehicle and the following vehicle for hitchless towing by, responsive to determining the lead vehicle is moving, i) controlling the following vehicle to travel the hitching path, ii) controlling the following vehicle to follow a path history of the lead vehicle from a time prior to the following vehicle being towed, iii) controlling the following vehicle to orient itself in a similar orientation as the lead vehicle; and
  controlling the following vehicle to perform the hitchless towing by following the lead vehicle without a physical connection.

15. The method of claim 14, wherein aligning the following vehicle includes:
  determining that the lead vehicle is stationary as the following vehicle travels the hitching path; and
  controlling the following vehicle to move behind an initial position of the lead vehicle in a similar orientation as the lead vehicle.

16. The method of claim 14, wherein controlling the following vehicle to follow a path history of the lead vehicle includes controlling the following vehicle to follow a sequence of points defined by the path history.

17. The method of claim 14, wherein controlling the following vehicle to travel on the hitching path includes:
  acquiring sensor data from one or more sensors of the following vehicle about the hitching path;
  processing the sensor data to identify one or more obstacles on the hitching path; and
  controlling the following vehicle to avoid the one or more obstacles on the hitching path.

18. The method of claim 14, wherein generating the hitching path includes:
  determining the physical constraints associated with the following vehicle, including the dimensions of the following vehicle and the turning radius of the following vehicle.

19. The method of claim 14, wherein generating the hitching path includes:
  determining a position and an orientation of the lead vehicle and a position and an orientation of the following vehicle;
  generating the hitching path from the position of the following vehicle to the position of the lead vehicle; and
  generating one or maneuvers for the following vehicle to adjust the orientation of the following vehicle to be similar orientation of the lead vehicle by steering the following vehicle to a particular degree so that a front end of the following vehicle is facing a similar direction as a front end of the lead vehicle.

20. The method of claim 14, wherein controlling the following vehicle to perform the hitchless towing includes:
  determining a trajectory of the lead vehicle; and
  controlling the following vehicle to follow the trajectory.

* * * * *